Dec. 29, 1936.                B. L. WALKER                2,066,063
                            AIR DRIVEN DISPLAY
                          Filed Feb. 10, 1936       3 Sheets-Sheet 1
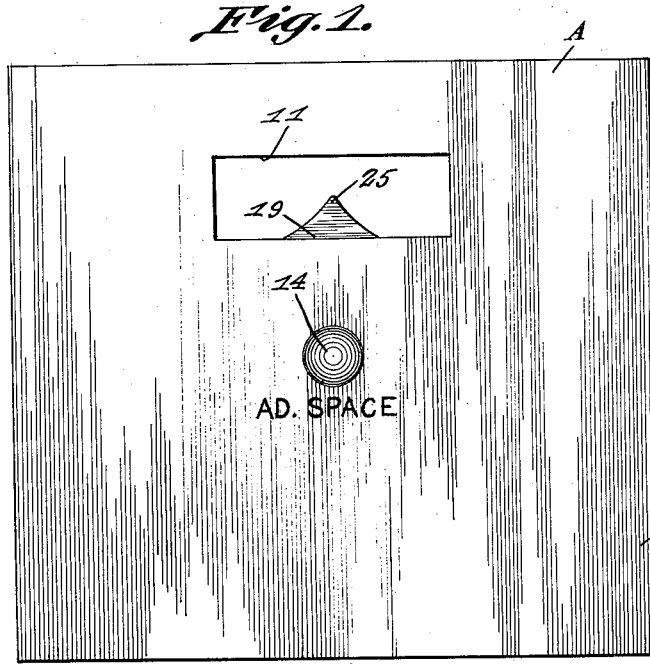
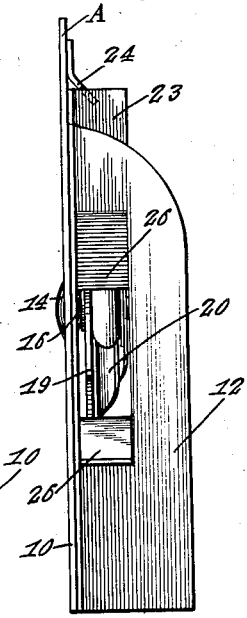
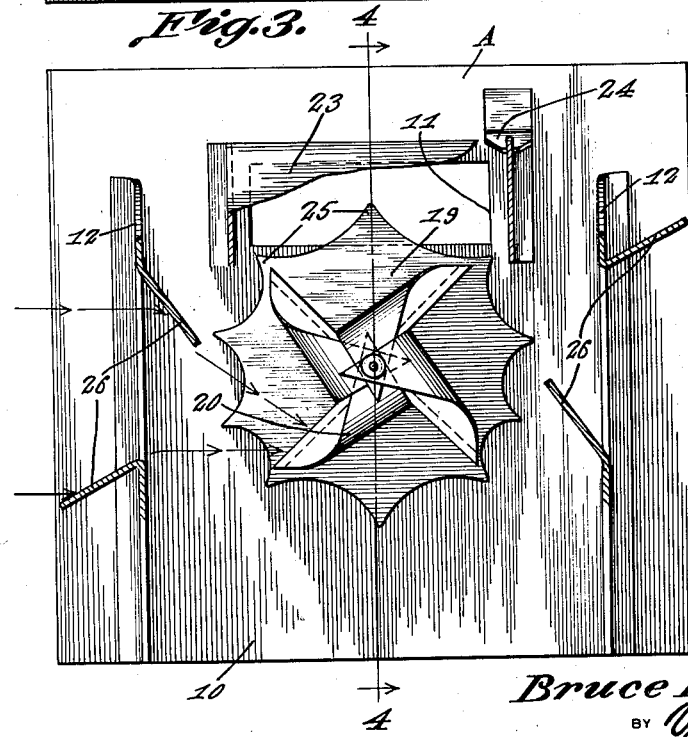
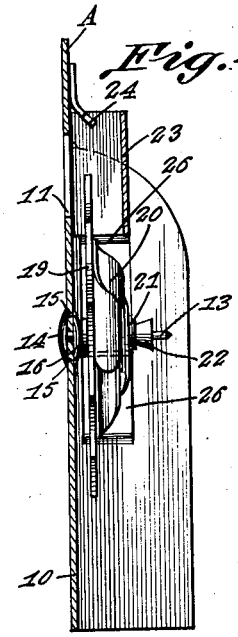
Bruce L. Walker, INVENTOR
BY Victor J. Evans & Co.
ATTORNEY Dec. 29, 1936.  B. L. WALKER  2,066,063
AIR DRIVEN DISPLAY
Filed Feb. 10, 1936   3 Sheets-Sheet 2
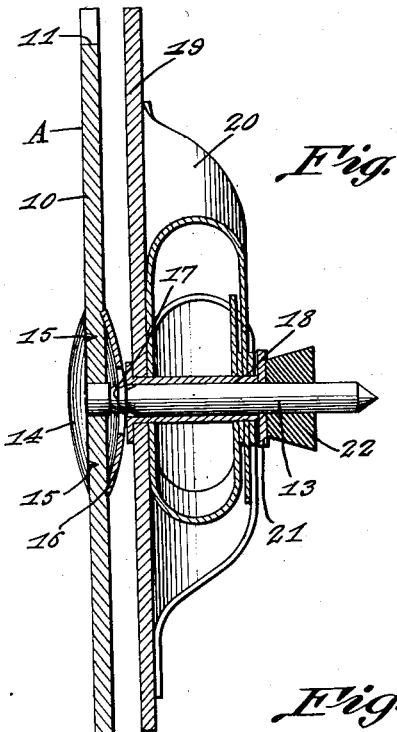
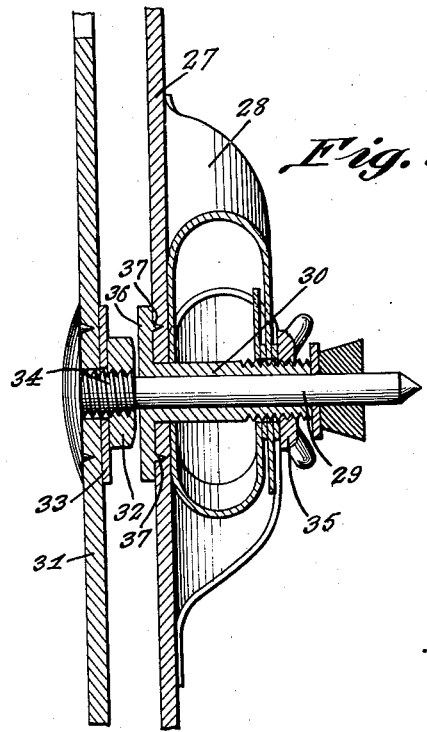
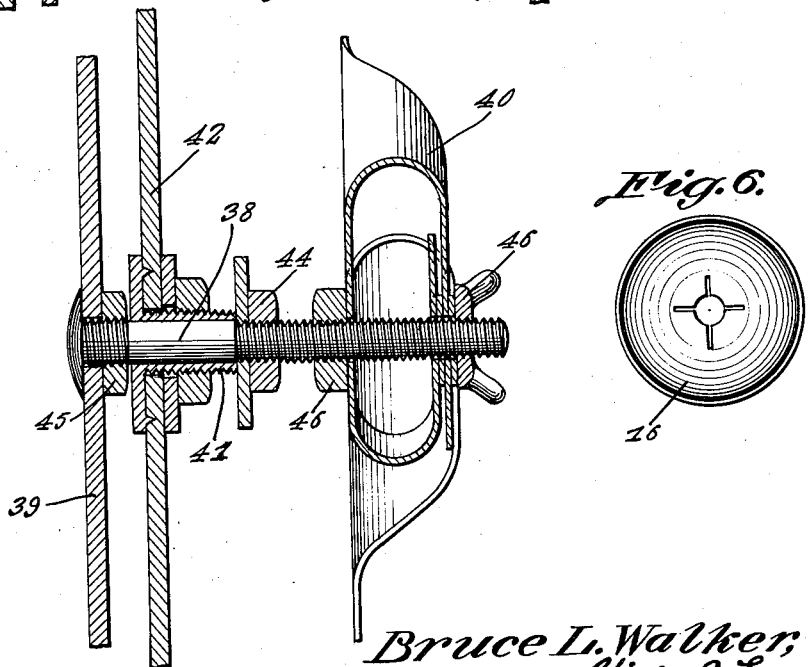
Bruce L. Walker, INVENTOR
BY Victor J. Evans & Co.
ATTORNEY Dec. 29, 1936.       B. L. WALKER       2,066,063
AIR DRIVEN DISPLAY
Filed Feb. 10, 1936       3 Sheets-Sheet 3
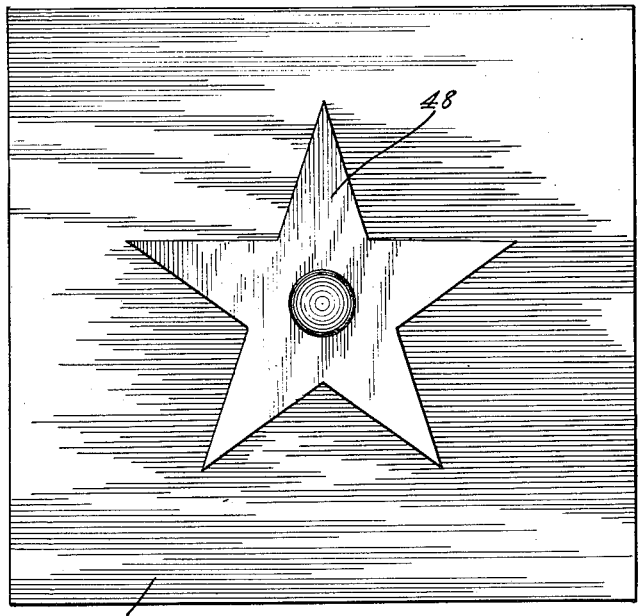
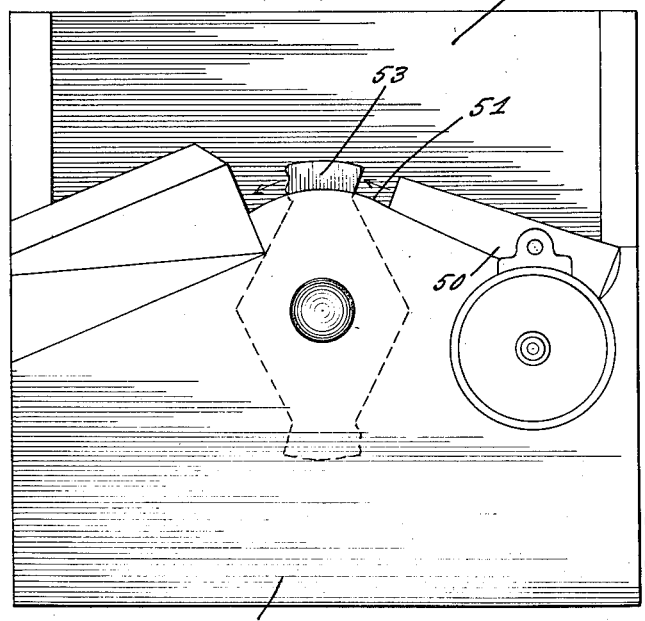
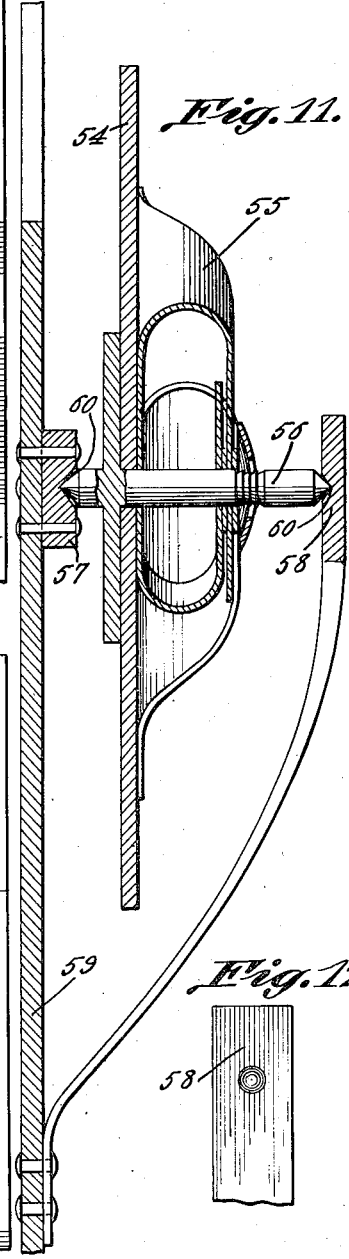
Bruce L. Walker, INVENTOR
BY Victor J. Evans & Co.
ATTORNEY Patented Dec. 29, 1936

2,066,063

UNITED STATES PATENT OFFICE 2,066,063

AIR DRIVEN DISPLAY

Bruce L. Walker, Oklahoma City, Okla.

Application February 10, 1936, Serial No. 63,226

2 Claims. (Cl. 40—125)

The invention relates to an advertising device and more especially to an animated display stand or easel.

The primary object of the invention is the provision of a device of this character, wherein a movable element can be set in motion by air current so as to lend attractiveness to an advertising medium as may be displayed on the easel or stand as the animated characteristic of the object when in motion will call for attention by a casual observer to a greater degree than if the object were at a standstill.

Another object of the invention is the provision of a device of this character, wherein the same is of novel construction and is susceptible of many variations in display for attracting attention by observers due to the fact that an object is movable for rendering the device animated.

A further object of the invention is the provision of a device of this character, which is comparatively simple in construction, thoroughly reliable and effective in its operation, readily and easily portable enabling the same to be placed within a showcase, upon a counter, within a show window or other places for the display of advertising matter and for drawing attention thereto, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a front elevation of a device constructed in accordance with the invention.

Figure 2 is a side elevation thereof.

Figure 3 is a rear elevation.

Figure 4 is a sectional view on the line 4—4 of Figure 3 looking in the direction of the arrows.

Figure 5 is a fragmentary vertical transverse sectional view through the device showing in detail the mounting of the rotary drive wheel of the device.

Figure 6 is a plan view of a friction washer for such mounting.

Figure 7 is a view similar to Figure 5 showing a slight modification.

Figure 8 is a view similar to Figure 7 showing a further modification.

Figure 9 is a front elevation of a modified form of easel.

Figure 10 is a front elevation of another modified form of easel.

Figure 11 is an enlarged fragmentary vertical sectional view showing a still further modification of a mounting for the drive wheel.

Figure 12 is a fragmentary elevation of a bearing shown in Figure 11.

Similar reference characters indicate corresponding parts throughout the several views in the drawings.

Referring to the drawings in detail, particularly Figures 1 to 5 inclusive, the device comprises a stand or easel A made from a sheet of stiff card or paper board 10 and may be of any size and shape having provided therein a window 11 while carried at the rear of this card or board are foldable props or braces 12, these being foldable at right angles to the card or board 10 which constitutes a face plate and are of a kind to support the said face plate in perpendicular position when brought to rest upon a base.

Below the window 11 and fitted in the face plate is a headed pin constituting an arbor 13, the head 14 having biting spurs 15 for engagement in the outer side of the face plate to hold the arbor 13 stationary while rearwardly of this face plate is a concavo convex clamping washer 16 having ratchet engagement at 17 with the arbor 13 for clamping action against the inner side of the face plate to hold the arbor fixed within the latter. Rotatably supported on the arbor 13 is the hub 18 carrying a movable pattern 19 and a pin wheel 20, respectively, these being fixed upon the arbor and the pattern 19 is displayed through the window 11 from the front of the face plate of the easel A. The hub 18 is retained upon the arbor 13 by a washer 21 and a resilient retaining nut 22, respectively, the latter being frictionally held fixed upon the said arbor 13.

Carried at the back of the face plate 10 of the easel A is a backing strip 23 of paper which is held in confronting relation to the said window by a latching piece 24 and this strip 23, the tip 25 of the pattern 19 being movable between the window 11 and the said strip 23 which is held offset rearwardly from the window by the said latch piece 24.

The props or braces 12 have cut and bent therefrom air deflectors or wings 26 for directing air currents to and from the pin wheel 20 so that such air currents will cause rotation of the said pin wheel in one direction to give animation or activity to the pattern 19 which may be of any shape or formation so as to have a part thereof visible through the window 11 when the said pattern is in motion.

The outer side of the face plate is adapted to carry suitable advertising matter for the display of the same and in conjunction with this display is the exhibiting of the pattern 19 while in motion thus enhancing the attractiveness of the display and commanding a greater degree of attention to the same by the animated characteristic of the pattern 19.

In Figure 7 of the drawings there is shown a slight modification of the mounting for the movable pattern 27 and pin wheel 28, respectively, in that the arbor 29 carrying the hub 30 for the said pattern and wheel is fixed to the face plate 31 by a jam nut 32 active against the washer 33 for the fastening of the arbor stationarily in place on the face plate, the nut 32 being threaded on said arbor at 34 while the washer 33 loosely surrounds this arbor. The pattern 27 and the pin wheel 28 are fixed upon the hub 30 by a winged nut 35 threaded on said hub. The hub 30 at the end 36 has spurs or projections 37 biting into the pattern 27.

In Figure 8 of the drawings there is shown a further modification of mounting wherein there is employed a threaded bolt 38 which constitutes an arbor for the pattern 39 and pin wheel 40, respectively. The bolt 38 is journaled in a threaded hub 41 which is made fast in the easel 42 through the use of a nut 43 while the bolt 38 carries a nut 44 which coacts with the nut 45 securing the pattern 39 to said bolt to prevent longitudinal displacement of the bolt in the hub 41. The pin wheel 40 is held fast on the bolt 38 by the nuts 46, the said pin wheel being devoid of mounting on the hub 41 but is carried directly on the bolt 38.

In Figure 9 of the drawings the face plate 47 of the easel has forwardly thereof a star pattern 48 which is rotatably supported and is in full view at the front of said easel.

In Figure 10 of the drawings upon the face plate 49 at the outer side thereof is created a reproduction of a cannon 50, the face plate 49 being cut away at its upper portion as at 51 and this cut away portion is confronted by the backing strip 52 while rendered visible at this cut away portion 51 is a movable pattern 53 which is rotatably supported and cooperates with the reproduction cannon display 50 so as to imitate when in motion a firing or flashing of the cannon as in action.

In Figure 11 of the drawings the rotatable pattern 54 and pin wheel 55 are fixed to an arbor 56 which is journaled in the bearings 57 and 58, respectively, the latter being in the form of a bracket fixed to the face plate 59 which also has the bearing 57 fixed thereto at the rear side of the same, the arbor 56 being formed with the pointed ends 60, these being journaled in said bearings so as to render the pattern 54 and pin wheel 55 sensitive for rotation through the force of light wind currents. The wind currents are created from an electric fan properly positioned to have the air currents therefrom play upon the pin wheel for setting the same in motion. The easel or stand may be placed within a showcase, show window or upon a counter or other support, or the same may be hung from a support, the locating and supporting of the said easel or stand for effective display purposes being optional with the user of the device.

Furthermore, it is contemplated that the pin wheel in the preferred and modified forms either be eccentrically mounted or that one of the blades of the wheel be weighted so that when the wheel becomes motionless it will always stop in a particular position so that a selected portion of the pattern rotating with such wheel will confront the window in the easel for the display of the portion and have the same clearly visible.

In Figure 11 of the drawings the pivot arbor 56 is not carried through the face plate so that such arbor is hidden from view.

It is, of course, understood that changes, variations and modifications may be made in the structure both in the preferred and modified forms as come properly within the scope of the appended claims without departing from the spirit of the invention or sacrificing any of its advantages, the device being also susceptible for operation by natural air currents or artificial air currents other than an electric fan, and for either indoor or outdoor use.

It is preferable to have the easel A, the pattern and the pin wheel made from paper stock.

What is claimed is:

1. A device of the character described comprising an easel, a rotatable pattern fitted with the easel and rendered visible, an arbor for said pattern, a pin wheel for driving said pattern and carried by said arbor, air current deflector wings arranged on said easel and related with said pin wheel at opposite sides thereof, means for fitting the arbor with the pattern and said easel, and supports for the easel and having the deflector wings formed therewith.

2. A device of the character described comprising a body having a flat front provided with a window and constituting an easel, a rotatable pattern visible through the window, an arbor for said pattern, a pinwheel on the arbor for driving said pattern, air current deflector wings arranged at opposite sides of the pattern and wheel, means for fastening the pattern and wheel to the arbor, means for setting the pinwheel when upon the arbor and supports for the easel and having the deflector wings formed therewith.

BRUCE L. WALKER.